(12) United States Patent
Jang et al.

(10) Patent No.: US 7,735,855 B2
(45) Date of Patent: Jun. 15, 2010

(54) BRACKET FOR SECURING SIDE AIRBAG FOR AUTOMOTIVE VEHICLE

(75) Inventors: Myung-ryun Jang, Suwon-si (KR); Byoung-sun Yoo, Seoul (KR); Tae-woo Kim, Wonju-si (KR); Dong-jun Lee, Wonju-si (KR); Eun-hwan Oh, Wonju-si (KR); Kyun-soon Choi, Jeonju-si (KR)

(73) Assignee: Delphi Korea Corporation, Troy, MI (US)

( * ) Notice: Subject to any disclaimer, the term of this patent is extended or adjusted under 35 U.S.C. 154(b) by 0 days.

(21) Appl. No.: 12/151,059

(22) Filed: May 1, 2008

(65) Prior Publication Data

US 2008/0284141 A1 Nov. 20, 2008

Related U.S. Application Data

(62) Division of application No. 11/717,423, filed on Mar. 13, 2007.

(30) Foreign Application Priority Data

| Mar. 14, 2006 | (KR) | ................... 20-2006-0006828 U |
| Mar. 17, 2006 | (KR) | ................... 20-2006-0007230 U |
| Mar. 27, 2006 | (KR) | ................... 20-2006-0008135 U |
| Apr. 18, 2006 | (KR) | ................... 20-2006-0010369 U |
| Apr. 20, 2006 | (KR) | ................... 20-2006-0010629 U |

(51) Int. Cl.
*B60R 21/16* (2006.01)

(52) U.S. Cl. .................... 280/728.2; 280/730.2; 24/289; 411/175

(58) Field of Classification Search .............. 280/728.2, 280/730.2; 24/289, 291, 292, 297, 295, 265 A, 24/265 AL, 265 R; 248/201, 500, 503, 505; 411/175
See application file for complete search history.

(56) References Cited

U.S. PATENT DOCUMENTS

| 2,671,254 | A | * | 3/1954 | Meyer | .......................... 24/291 |
| 5,735,418 | A | * | 4/1998 | Erb et al. | ..................... 215/237 |
| 5,951,046 | A | * | 9/1999 | Hosoda et al. | ........... 280/801.2 |
| 6,149,185 | A | * | 11/2000 | White et al. | ............. 280/728.2 |
| 6,450,747 | B1 | * | 9/2002 | Fischer | ........................ 411/174 |
| 6,793,241 | B2 | * | 9/2004 | Wallner et al. | ........... 280/730.2 |

(Continued)

FOREIGN PATENT DOCUMENTS

JP 2000079864 A * 3/2000

(Continued)

*Primary Examiner*—Ruth Ilan
*Assistant Examiner*—Drew Brown
(74) *Attorney, Agent, or Firm*—Thomas N. Twomey

(57) ABSTRACT

A bracket for securing a side airbag for an automotive vehicle is provided. The bracket includes a mounting plate formed of a synthetic resin material, and including a main body and a coupling part projecting from an upper surface of the main body and having a hole, and a bracket clip including two support plates in contact with front and rear surfaces of the coupling part and having through-holes in communication with the hole, and a bent part connecting the two support plates at each one side.

Therefore, it is possible to protect the bracket to prevent damage to or deformation of the bracket when a bolt is screwed, thereby maintaining the side airbag in an optimal state.

15 Claims, 16 Drawing Sheets

U.S. PATENT DOCUMENTS

| | | | |
|---|---|---|---|
| 7,320,477 B2 * | 1/2008 | Kawabe et al. | 280/730.2 |
| 2003/0042712 A1 * | 3/2003 | Henderson et al. | 280/728.2 |
| 2003/0205887 A1 * | 11/2003 | Wallner et al. | 280/730.2 |
| 2003/0222435 A1 * | 12/2003 | Schmidt et al. | 280/728.2 |
| 2005/0029778 A1 * | 2/2005 | Weber et al. | 280/728.2 |
| 2005/0046154 A1 * | 3/2005 | Rhea et al. | 280/728.2 |
| 2006/0192368 A1 * | 8/2006 | Hall et al. | 280/730.2 |

FOREIGN PATENT DOCUMENTS

| | | | |
|---|---|---|---|
| JP | 2007182134 A | * | 7/2007 |

* cited by examiner

FIG. 2A
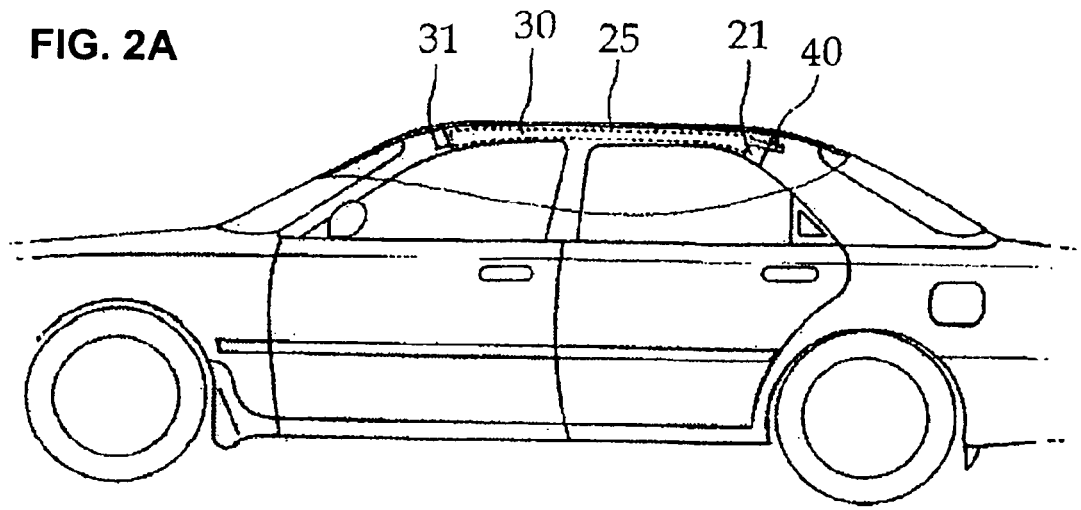
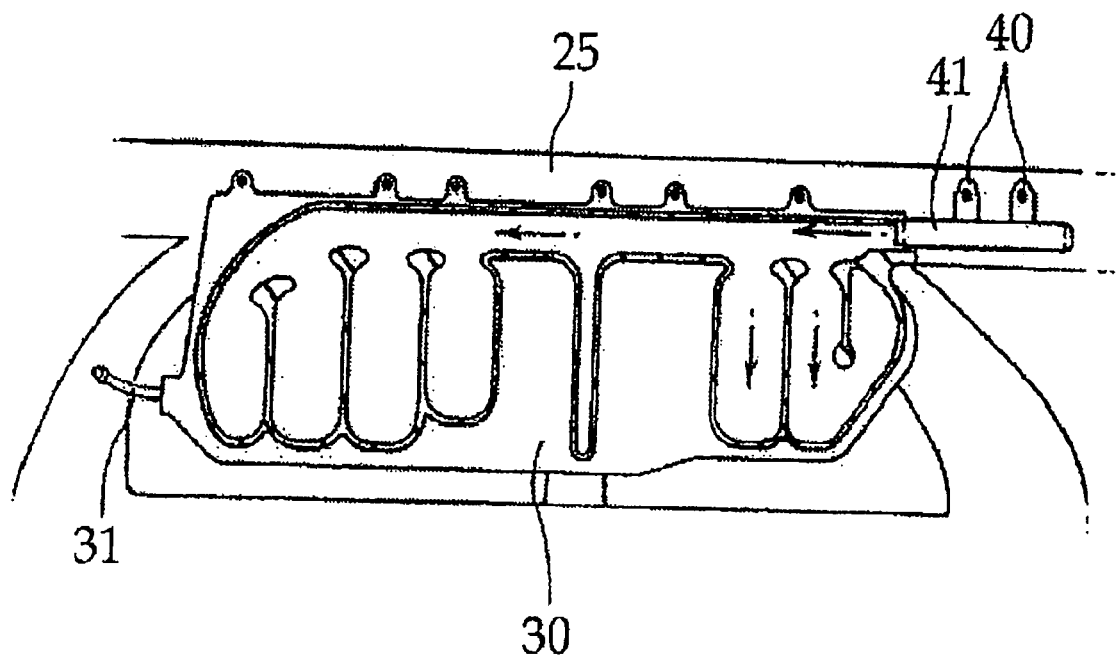
FIG. 2B

BRACKET FOR SECURING SIDE AIRBAG FOR AUTOMOTIVE VEHICLE

CROSS-REFERENCE TO RELATED APPLICATION

This application is a divisional of U.S. application Ser. No. 11/717,423, filed Mar. 13, 2007, which claims the benefit of Korean Utility Model Application No. 2006-0006828, filed on Mar. 14, 2006, No. 2006-0007230, filed on Mar. 17, 2006, No. 2006-0008135, filed on Mar. 27, 2006, No. 2006-010369, filed on Apr. 18, 2006, and No. 2006-010629, filed on Apr. 20, 2006, the disclosure of which is hereby incorporated herein by reference in its entirety.

BACKGROUND OF THE INVENTION

1. Technical Field

The present invention relates to a bracket for securing a side airbag for an automotive vehicle and, more particularly, to a bracket for securing a side airbag for an automotive vehicle, which easily secures the side airbag and is prevented from being broken or deformed when it is fastened by a bolt.

2. Discussion of Related Art

In addition to a safety belt, generally, an airbag module installed in an automotive vehicle is a device for maximally protecting an occupant against injury when the automotive vehicle crashes.

An airbag module is typically installed in or around a steering wheel of a driver seat and in an instrument panel of a passenger seat. When an automotive vehicle crashes, the airbag module is operatively connected to a safety belt by a crash sensing sensor and an electronic control unit (hereinafter, referred to as "ECU"), and it maximally protects an occupant against injury.

That is, when an automotive vehicle crashes, the crash sensing sensor outputs a crash sensing signal to the ECU. The ECU determines whether to operate an airbag, depending on the intensity of the crash. If the airbag needs to be operated, the ECU operates an inflator to inflate the airbag.

In recent years, an airbag module has been installed at a side in an automotive vehicle, to protect an occupant upon a side impact crash.

The airbag module installed at the side of an automotive vehicle is generally called a 'side airbag.'

The side airbag is installed in an A-pillar which is connected from the front passenger seat to the back seat. When side impact is applied, the side airbag is inflated by the operation of the inflator.

In this application, a side airbag is used for an automotive vehicle, which prevents excessive inflation pressure from being applied to a lower end part of the side airbag to be deployed when the vehicle encounters a side crash, and balances the inflation pressure by an injected gas in a thorax bag and a head bag to reduce shaking when the side airbag is inflated and improves the work efficiency upon manufacture.

The constitution of a side airbag will be described, in brief, with reference to FIG. 1A. The side airbag comprises: a thorax bag 12 and a head bag 11 to be deployed upon a side crash. The thorax bag 12 comprises a mounting part 14 and a lower end part 16. The mounting part 14 has a neck shape at a rear side of the thorax bag 12. The lower end part 16 is formed at a distance from the mounting part 14.

An upper part and a lower part of the side airbag are formed symmetrically, based on the center of the mounting part 14. A tether 13 is positioned between the thorax bag 12 and the head bag 11. A vent aperture is formed in the side airbag at a distance from the mounting part 14. A pulling plate 15 is symmetrical with the thorax bag 12, and the thorax bag 12 is extended from the head bag 11.

The aforementioned side airbag is installed by fastening a bolt to the A-pillar of the automotive vehicle. To install the side airbag onto the A-pillar, additional securing devices are needed.

That is, a number of brackets, each having a securing aperture into which a bolt is inserted, are positioned at predetermined positions of the side airbag and are secured by fastening bolts.

An example of a conventional securing device of the aforementioned side airbag will be described with reference to FIG. 1B. A bracket 3a with a welding bolt 2a is welded at one side of a back part frame 1a. A back part 7a with a pad 5a covered by a cover 6a is positioned at one side of an installation space 4a of the side airbag.

The end of the cover 6a is inserted into the airbag installation space 4a. Therefore, one side of each of the airbag housing 8a and the airbag door 9a is positioned inside a support wire 10a, and the other side of each of the airbag housing 8a and the airbag door 9a is fixed to the welding bolt 2a of the bracket 3a.

However, since the conventional bracket for securing the side airbag is usually made of plastics, the bracket is broken or deformed while the bolt is fastened and therefore, the bracket cannot perform its function. Moreover, since this problem makes it impossible for the side airbag to be normally operated, an occupant is fatally injured.

Another conventional side airbag 30 comprises: an airbag which is installed inside a headlining of a roof side panel; an inflator which is installed at one side of the airbag and which has a gas generating material to deploy the airbag upon a side crash; and a guide member with one side end which is connected to the airbag and the other side end which is positioned to pivot around the roof side panel.

The constitution of the aforementioned side airbag 30 will be described, in detail, with reference to FIGS. 2A and 2B.

As described in FIG. 2, a headlining 21 is composed of plastics which are attached to the ceiling inside an automotive vehicle. Basic materials of the headlining 21 are the surface and pad with the functions, such as insulation from the roof, insulation of sound, or absorption of sound inside the vehicle and the like. The headlining 21 is formed integrally with these surface and pad.

As a device to perform an operation of deploying the side airbag 30, an inflator 40 rapidly burns a gas generating material including an element of sodium nitrite, and the like, by using an igniter and simultaneously generates nitrogen gas. The inflator 40 is secured to a roof side panel 25 by a separate bracket 41.

A strap 31 (hereinafter, referred to as "connection strap") is positioned at the other side of the inflator 40. The strap 31 prevents one side of the side airbag 30 from waving when the airbag 30 is deployed by the inflator. This is illustrated in FIG. 2B.

However, since the conventional side airbag has no specific structure to hold the connection strap, it is troublesome to assemble the side airbag in the A-pillar due to the interference between the A-pillar and the connection strap.

That is, an operator in a manufacturing site needs to check whether there is the interference with the connection strap when assembling the side airbag in the A-pillar. When interference occurs, a process of avoiding the interference is added. As a result, a working time becomes longer and the assembling efficiency is deteriorated.

Further, as illustrated in FIG. 3A, a conventional bracket 50 for securing a side airbag has a shape in which a connection strap 52 is connected to a simply long rectangular aperture 51. Therefore, the bracket 50 is not properly connected to the connection strap 52.

That is, since the connection strap 52 is movable in the bracket 50, the connection strap 52 turns within the rectangular aperture 51 of the bracket 50, as illustrated in FIG. 3B.

Therefore, when the side airbag is mounted in an automotive vehicle, there are added a process of checking whether a state of the bracket is good or bad and, if the connection strap 52 turns, a process of returning the connection strap 52 to its original position. Consequently, the work becomes troublesome.

Moreover, the bracket 50 is pulled towards the side airbag due to momentary gas explosive power which is generated while the side airbag is operated upon an accident. In this case, the connection strap 52 inclines towards a lower part of the rectangular aperture 51 as illustrated in FIG. 3C. Consequently, the side airbag is not stably secured.

Moreover, when a connection strap 52 is cut by the friction caused during the accident, the side airbag is not inflated in a normal direction, upon the side crash.

Another conventional side airbag 60 will be described with reference to FIGS. 4A and 4B.

As illustrated in FIGS. 4A and 4B, the side airbag 60 comprises: a side airbag cushion 61, an inflator 62 supplying a gas to the side airbag cushion 61, a housing receiving the inflator 62, and a diffuser 64 included in the side airbag 60 and supplying a gas, which is generated from the inflator 62, to the side airbag cushion 61.

The inflator 62 is electrically connected to a control unit (not shown). The control unit is connected to a crash sensing sensor (not shown) in an automotive vehicle.

The side airbag cushion 61 is formed, at predetermined width and length, to sufficiently protect a head part of an occupant of the automotive vehicle. A tether 65 is provided in one part of an end of the side airbag cushion 61. The tether 65 guides the side airbag 60 to be broadly inflated lengthwise or widthwise when the side airbag 60 is deployed.

The diffuser 64 has a tube shape. A number of apertures (not shown) are formed, to be positioned lengthwise, on an outer circumference surface of the diffuser 64. While the diffuser 64 is received inside an upper end part of the side airbag 60, one end of the diffuser 64 is connected to the housing 63 receiving the inflator 62.

When the diffuser 64 and the housing 63 are connected to each other, a holder 66 fastens a part of the side airbag 60 which covers the connection part of the diffuser 64 and the housing 63, to be sealed.

A number of holders 67 are connected to the upper end of the side airbag 60, at a predetermined interval. The holders 67 secure the side airbag cushion 61 to a roof rail. The holders 67 cover an external surface of a side airbag housing 68 and temporarily hold the side airbag housing 68. The side airbag housing 68 covers the side airbag cushion 61 which is folded.

However, in the conventional side airbag 60, the holders 67 securing the side airbag 60 are formed of a single material. When the holders 67 are made of a soft material, an additional component is needed to prevent the holders 67 from being broken when the side airbag 60 is secured to the automotive vehicle by fastening a bolt. When the holders are made of a hard material to prevent the holders from being broken, there is a difficulty in cutting a cutting part when the side airbag 60 is deployed.

Further, in the aforementioned conventional side airbag 60, a space of each holder 67 is narrow and a shape of the holder 67 is gradually narrower downwardly. Therefore, since a region for supporting the side airbag 60 is narrow, many holders 67 are needed. This results in a longer working time in the manufacturing site.

That is, when the conventional side airbag 60 is mounted, since the additional components are needed and a number of holders 67 are installed, the assembling efficiency is lowered and the operability is not consistently provided by the defect of assembly.

SUMMARY OF THE INVENTION

Therefore, an object of the present invention is to provide a bracket for securing a side airbag for an automotive vehicle capable of reinforcing a mounting plate to prevent damage or deformation of the mounting plate upon fastening of a bolt, so that the side airbag can fulfill its function.

Another object of the present invention is to provide a bracket for securing a side airbag for an automotive vehicle capable of stably fixing the side airbag without additional parts.

Still another object of the present invention is to provide a bracket for securing a side airbag for an automotive vehicle capable of smoothly deploying a cushion upon deployment of the side airbag.

In accordance with an exemplary embodiment of the present invention, a bracket for securing a side airbag for an automotive vehicle includes: a mounting plate formed of a synthetic resin material, and including a main body and a coupling part projecting from an upper surface of the main body and having a hole; and a bracket clip including two support plates in contact with front and rear surfaces of the coupling part and having through-holes in communication with the hole, and a bent part connecting the two support plates at each one side.

In addition, projection thresholds may be formed at both sides of the coupling part, and the support plates of the bracket clip may be disposed between the projection thresholds.

Further, the two support plates of the bracket clip may be formed about the bent part to be freely folded or unfolded.

Furthermore, the main body may have a coupling hole passing therethrough.

In addition, an annular threshold may be formed at an inner surface of any one support plate such that the annular threshold is inserted through the hole of the coupling part and the through-hole of the other support plate upon assembly.

Further, the annular threshold formed at the support plate may be formed around the through-hole of the support plate.

Furthermore, the bracket clip may have a hooking threshold projecting toward a vehicle body.

In addition, the coupling part may have a securing hook, a restraint member may be fixed to the main body to be at least partially bent, and a hook fastening part may be formed at one end of the restraint member to be coupled to the securing hook.

Further, stopper projections may be formed at both ends of the hook fastening part disposed at outer sides of the securing hooks to restrain lateral shaking of the hook fastening part.

Furthermore, a cut-out part may be formed at the bent part disposed inside the vehicle, among the bent parts of the restraint member.

In addition, the restraint member may be formed of synthetic resin.

Further, the securing hooks may be formed at the projection thresholds formed at both sides of the coupling part, respectively.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIGS. 2A and 2B show an example of another conventional side airbag;

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein.

First Exemplary Embodiment

A bracket for securing a side airbag for an automotive vehicle according to a first exemplary embodiment will be described, in detail, with reference to FIGS. 5 to 7.

Figure 1A:
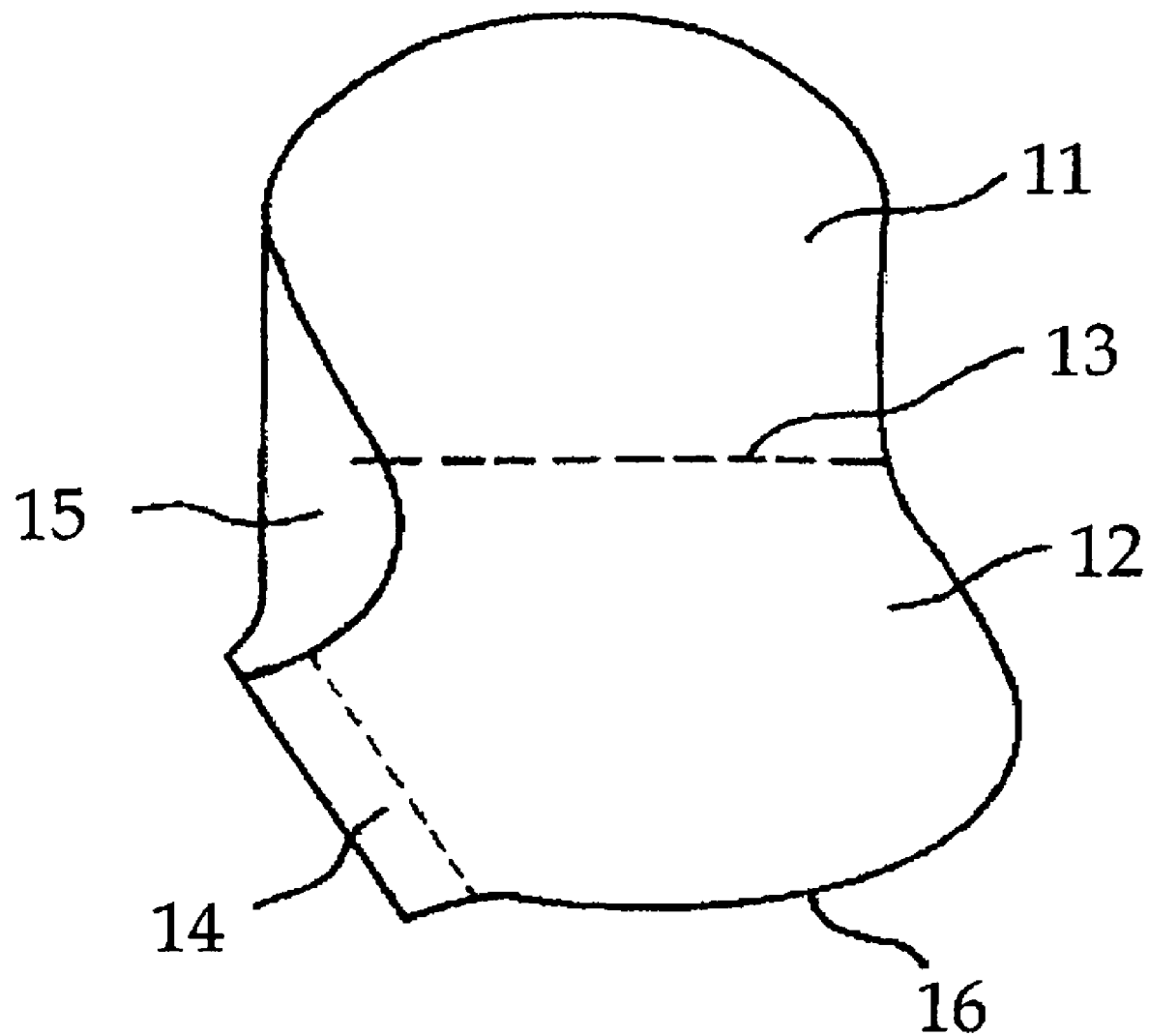
FIG. 1A shows an example of a conventional side airbag.
Figure 1B:
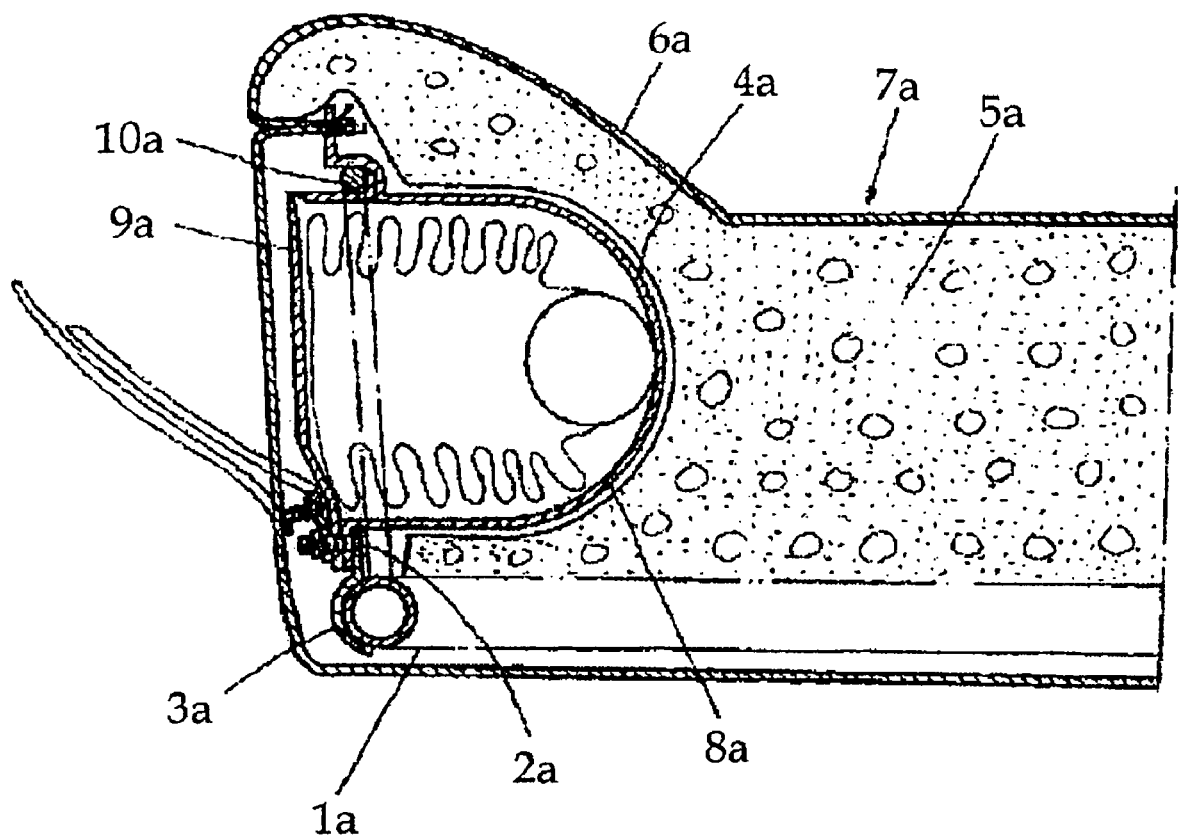
FIG. 1B shows an example of a conventional bracket for securing a side airbag.
Figure 3A:
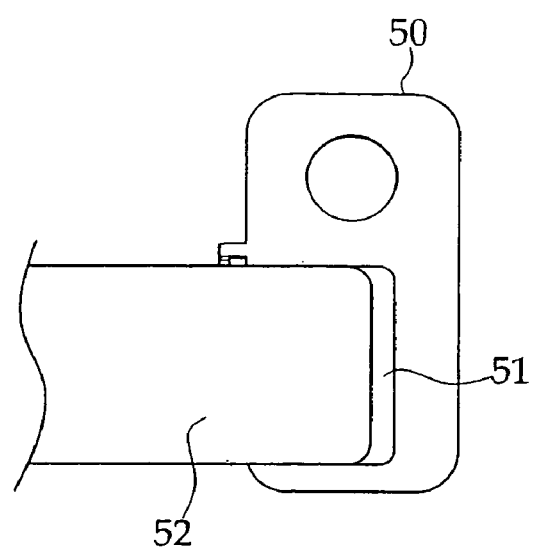
FIGS. 3A, 3B and 3C are front views of another conventional securing bracket.
Figure 3B:
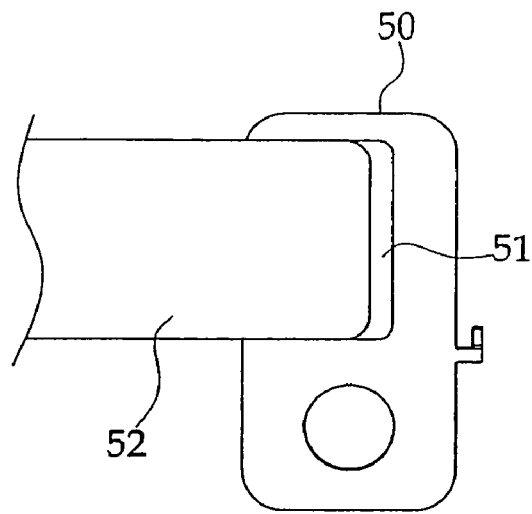
Figure 3C:
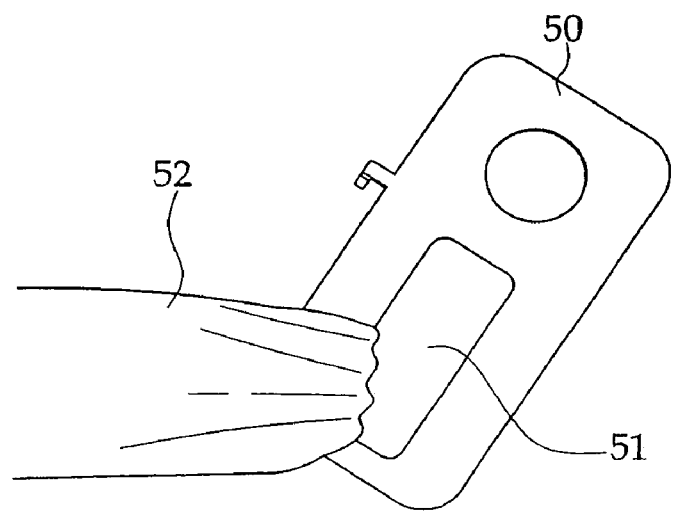
Figure 4A:
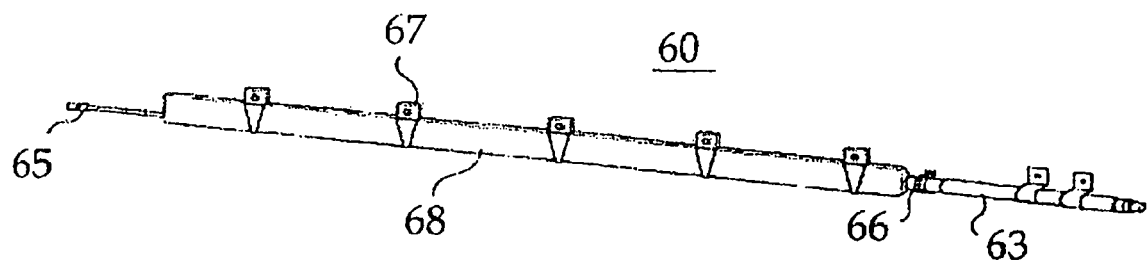
FIGS. 4A and 4B respectively show another conventional side airbag during assembly and disassembly.
Figure 4B:
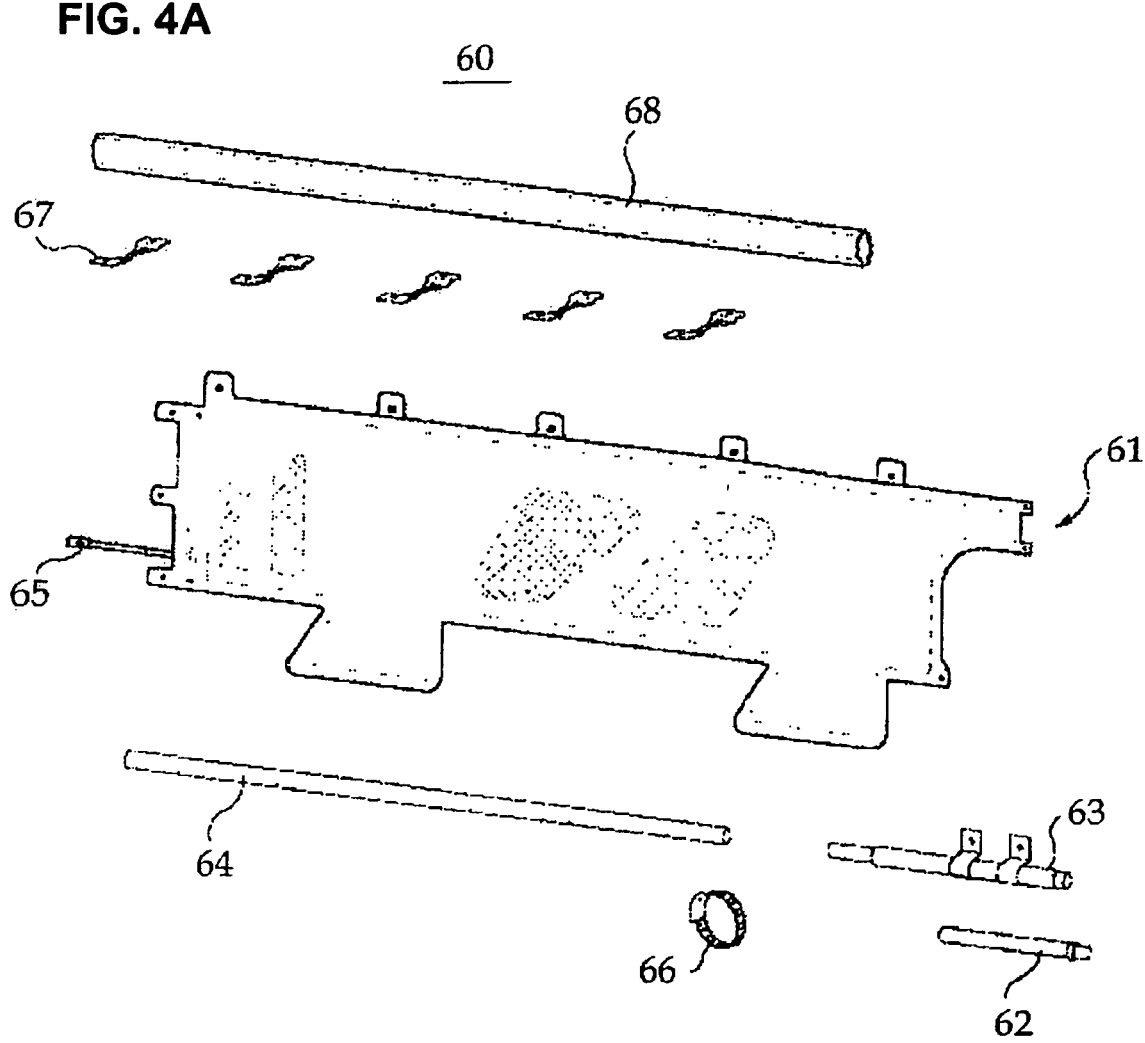
Figure 5:
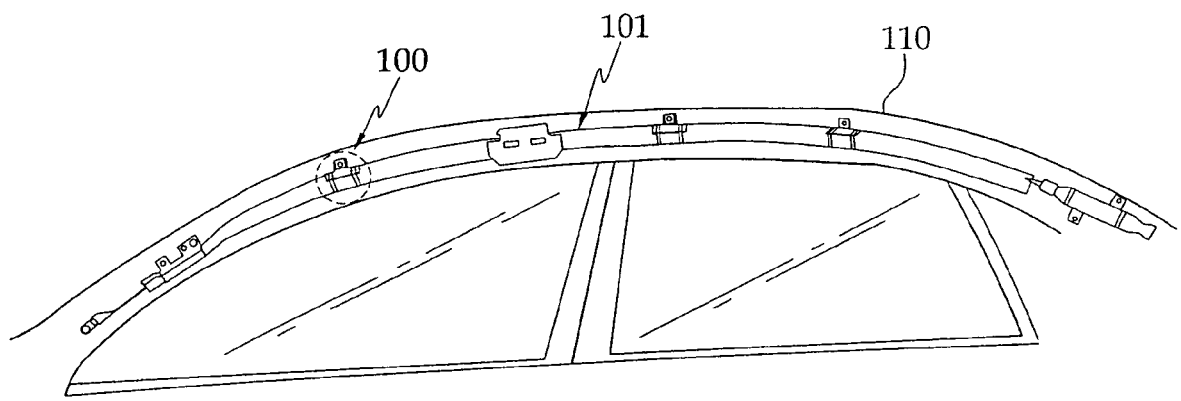
FIG. 5 is a view showing installation of a bracket for securing a side airbag for an automotive vehicle in accordance with the present invention.

First, as shown in FIG. 5, a side airbag extends forward and backward along a roof rail of a vehicle body, and is fixed by a side airbag securing bracket 100.

As shown in FIG. 6, the side airbag securing bracket 100 for an automotive vehicle in accordance with the present invention includes a mounting plate 130, and a bracket clip 120 coupled to the mounting plate 130.

The mounting plate 130, which functions to support a side airbag 101, is fixed to a pillar 110 as an upper frame of a side glass window or a roof side panel by fastening means such as a bolt.

The mounting plate 130 is manufactured by injection molding of plastics, and includes a main body 131 and a coupling part 132 projecting from an upper surface of the main body 131 and having a hole 132a.

Projection thresholds 133 are formed at both sides of the coupling part 132 to a predetermined height such that the bracket clip 120, which will be described, can be readily coupled thereto.

Figure 7:
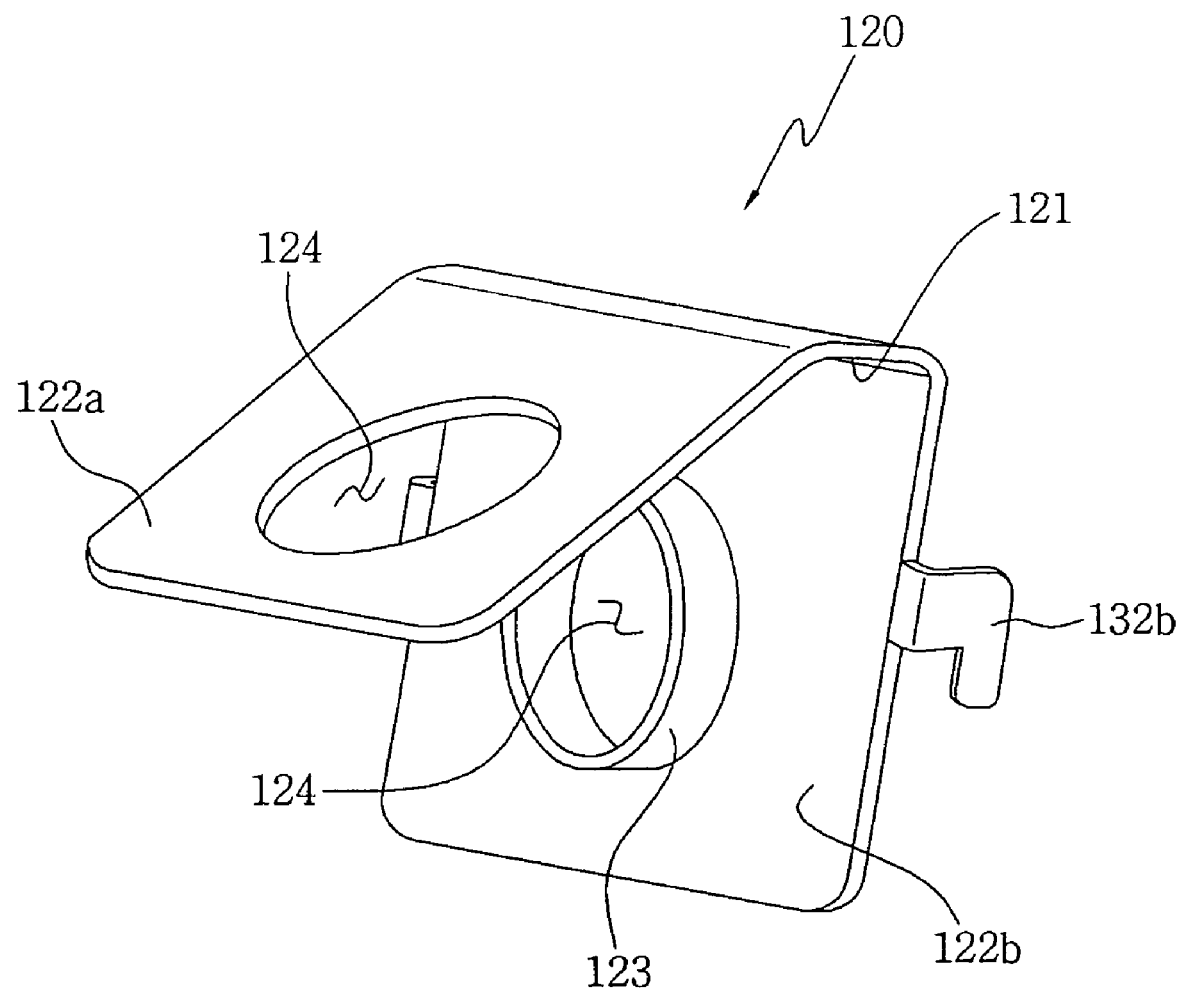
FIG. 7 is a perspective view showing the structure of a bracket clip of FIG. 6.
Figure 8:
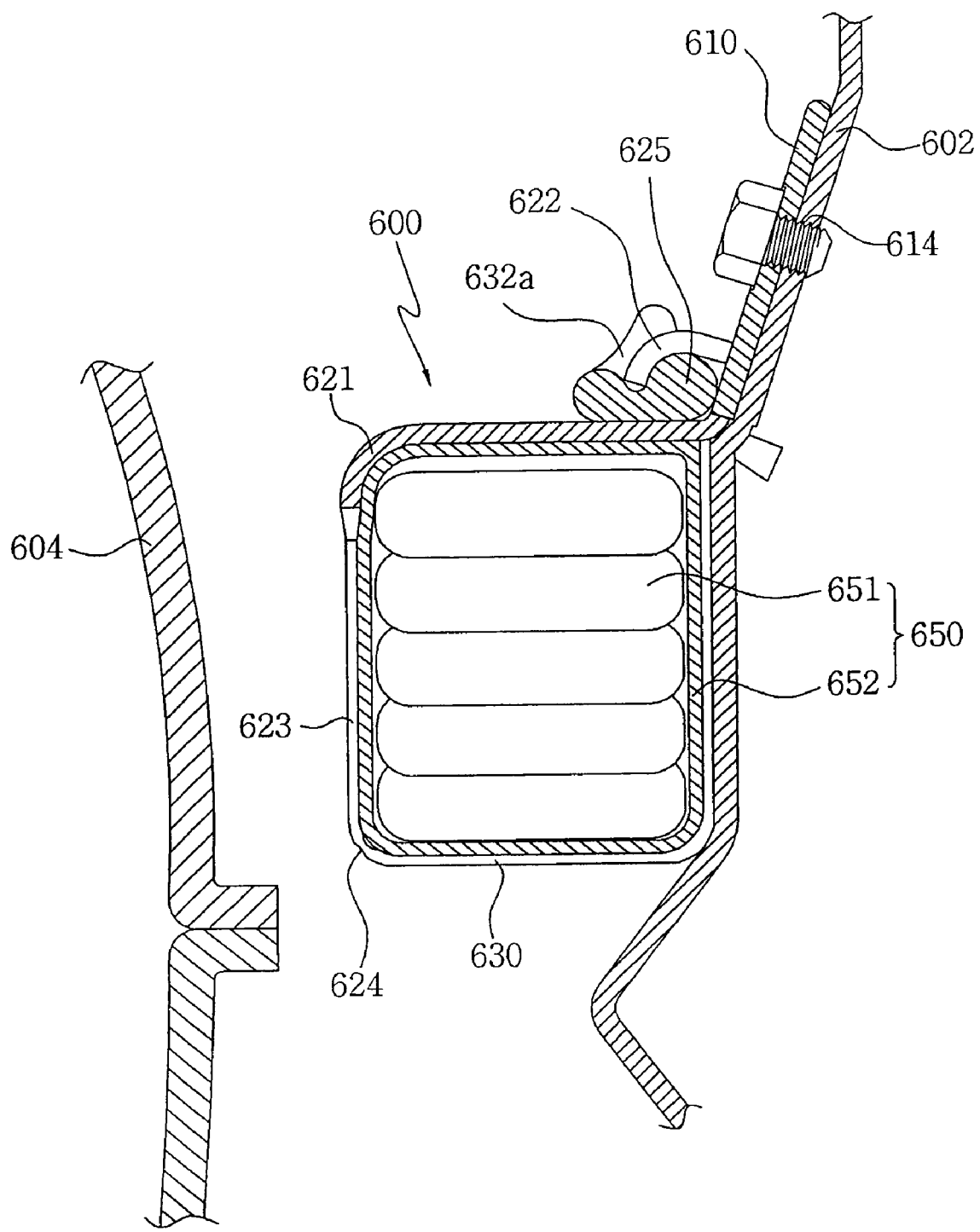
FIG. 8 is a cross-sectional view showing installation of a securing bracket in accordance with a second exemplary embodiment of the present invention.
Figure 9A:
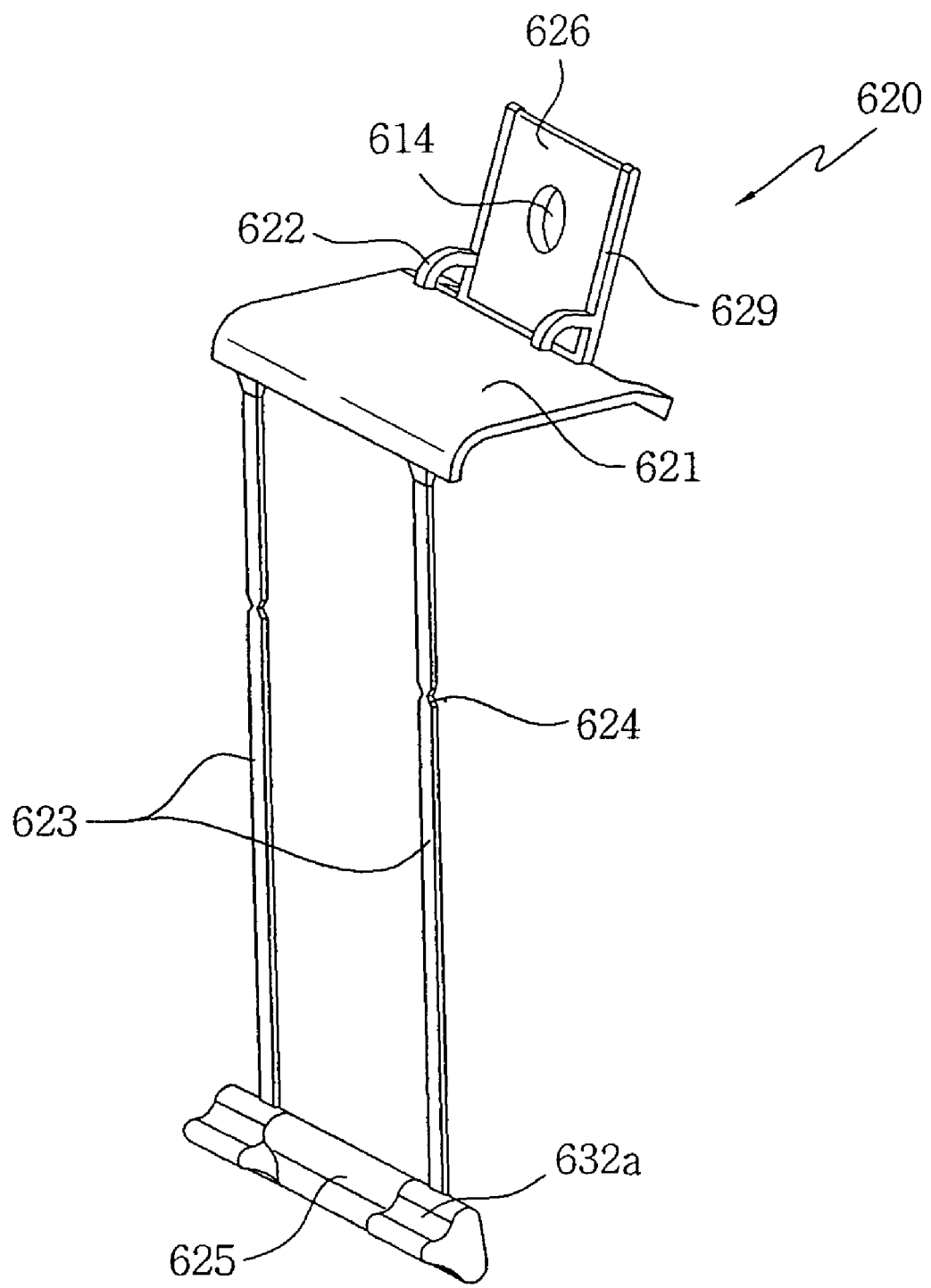
FIG. 9A is a perspective view of the securing bracket in accordance with a second exemplary embodiment of the present invention.
Figure 9B:
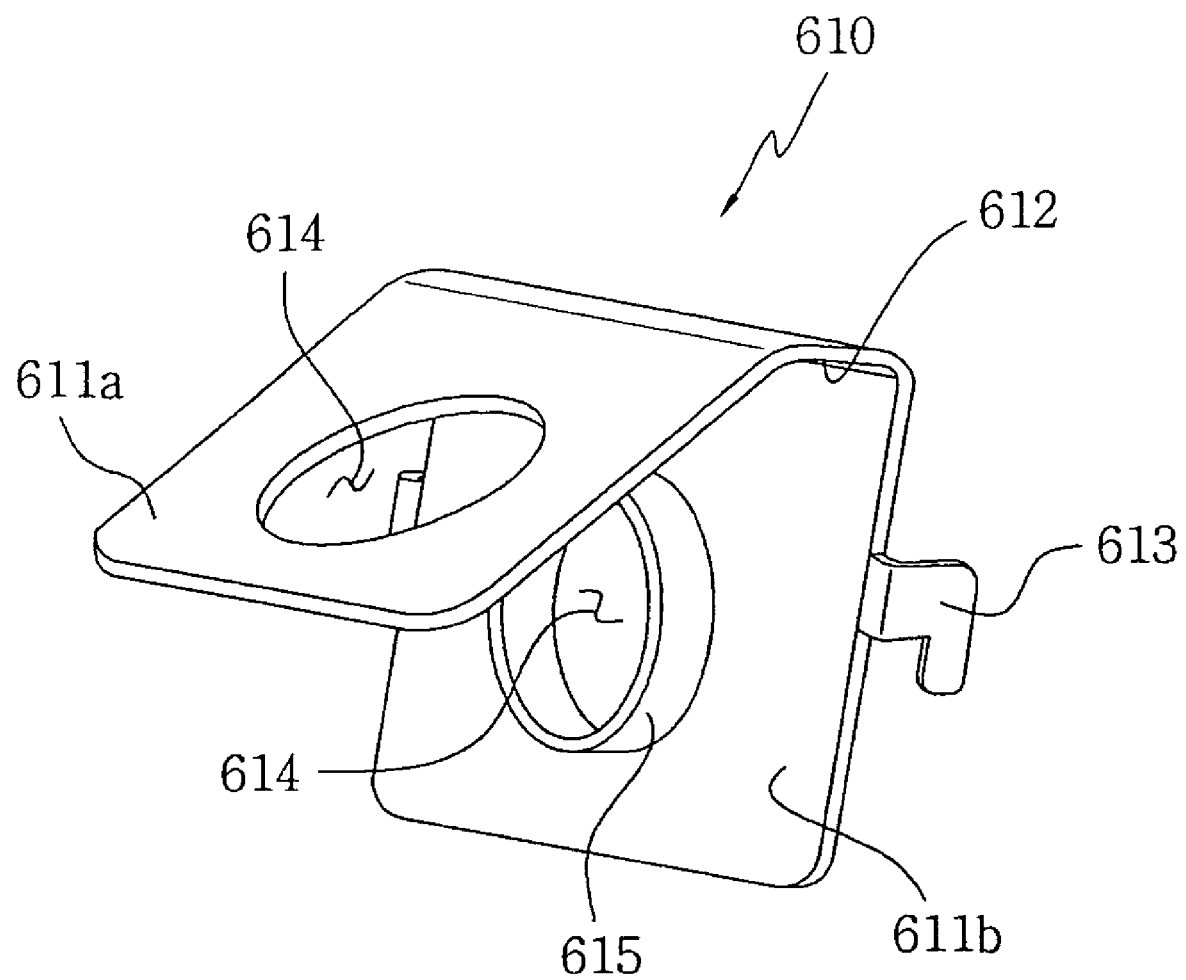
FIG. 9B is a perspective view of a bracket clip of FIG. 9A.

Meanwhile, the bracket clip 120 is a nearly rectangular metal plate as illustrated in FIG. 7, and a bending part 121 is formed in the middle of the bracket clip 120. Two support plates 122a and 122b are opposite to each other with the bending part 121 interposed therebetween.

The two support plates 122a and 122b may be formed of a flexible metal to be freely folded or unfolded.

In addition, through-holes 124 are formed in the support plates 122a and 122b to be in communication with the hole 132a of the coupling part 132 upon assembly.

Upon assembly to the mounting plate 130, the two support plates 122a and 122b of the bracket clip 120 are in contact with both surfaces of the coupling part 132.

In addition, a predetermined annular threshold 123 may be formed on an inner surface of any one of the support plates 122a and 122b (for example, the support plate 122b) along an outer circumference of the through-hole 124 such that the annular threshold 123 is inserted into the hole 132a of the coupling part 132 and the through-hole 124 of the other support plate 122a.

Further, the support plate of the bracket clip 120 is disposed between the two projection thresholds 133 formed at the coupling part 132.

For this purpose, the width of the bracket clip 120 is equal to or smaller than a gap between the two projection thresholds 133.

In addition, hooking thresholds 132b are formed at both sides of the bracket clip 120 toward a vehicle body to be temporarily hooked by hooking grooves (not shown) formed in the roof side panel or the pillar.

Hereinafter, an assembling process of the bracket according to the first embodiment of the present invention will be described.

Figure 6A:
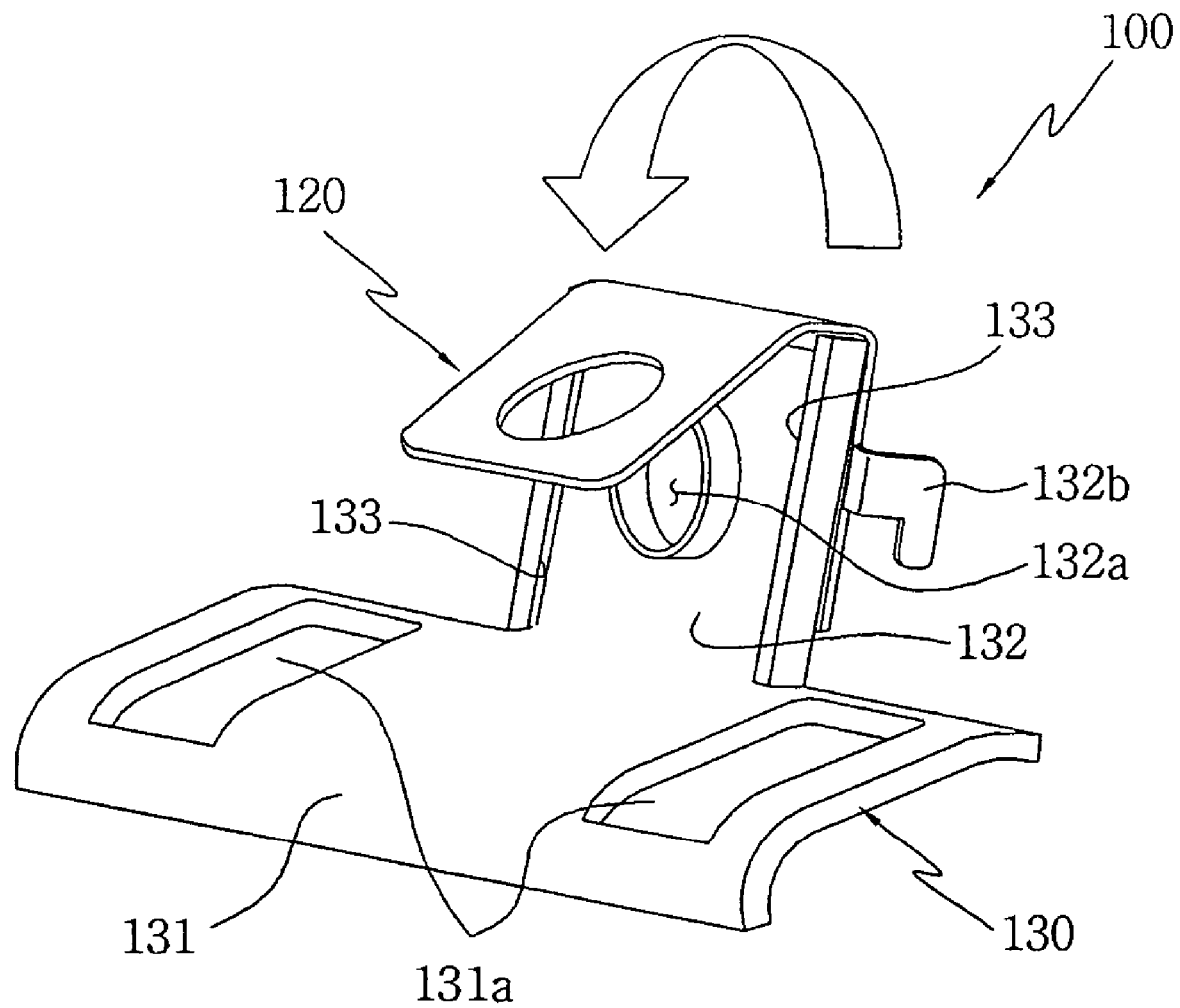
FIGS. 6A and 6B are perspective views showing the structure of a bracket for securing a side airbag for an automotive vehicle in accordance with a first exemplary embodiment of the present invention.

As illustrated in FIG. 6A, the bracket clip 120 is positioned at an external surface of the coupling part 132.

The bracket clip 120 is attached to the coupling part 132 by inserting the annular threshold 123 formed on one support plate 122b into the through-hole of the coupling part 132 and by folding the other support plate 122a, so that the support plates 122a and 122b cover the external surface of the coupling part 132.

Figure 6B:
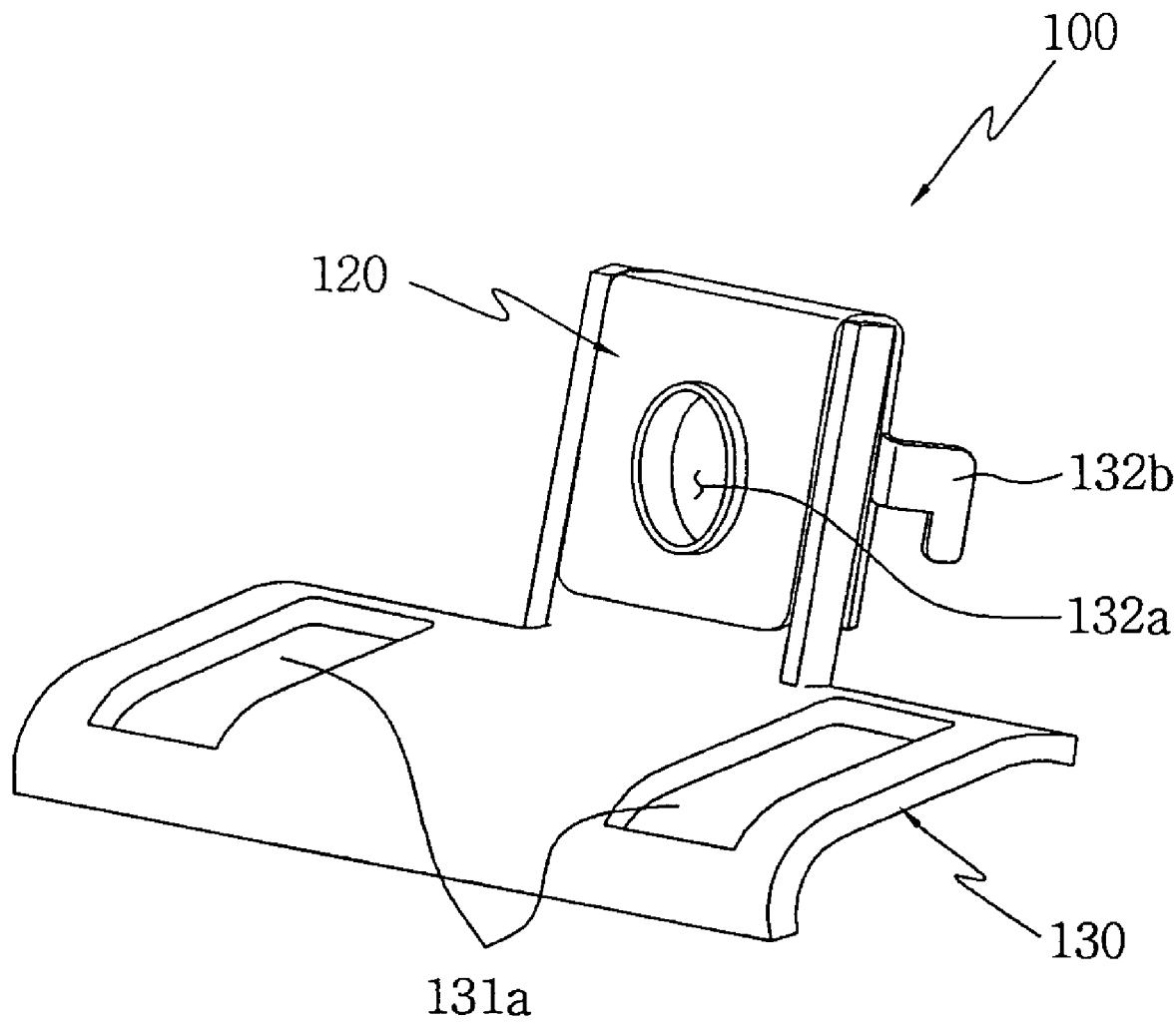

As illustrated in FIG. 6B, the two support plates 122a and 122b surround the external surface of the coupling part 132 of the mounting plate to complete assembly of the bracket 100 for securing a side airbag for an automotive vehicle according to the first exemplary embodiment of the present invention.

Then, the hooking thresholds 132b formed at the bracket clip 120 are hooked by hooking grooves (not shown) of the pillar or the roof side panel.

In this state, the completed side airbag securing bracket 100 for an automotive vehicle is installed at the pillar 110 as an upper frame of a side glass window and the roof side panel using fastening means such as a bolt, and so on, thereby completing installation at the vehicle.

In this case, by inserting the bolt (not shown) through the through-holes 124 formed in the support plates 122a and 122b of the bracket clip 120 and the hole 132a of the coupling part 132 and fastening the bolt, the side airbag securing bracket 100 for an automotive vehicle is fixed to the vehicle body.

At this time, even if the bolt is too tightly fastened, since the bracket clip 120 formed of a metal material protects the coupling part 132, the coupling part 132 is prevented from being broken or deformed.

The side airbag 101 is disposed under the main body 131 of the mounting plate 130, and securely fixed by appropriate fastening means (not shown) through a coupling hole 131a formed in the main body 131.

While not shown, the side airbag for an automotive vehicle is connected to a sensor for detecting collision of the vehicle, and an electronic control unit for receiving a signal from the sensor to operate an inflator.

Second Exemplary Embodiment

Meanwhile, FIGS. 8 to 11 illustrate a bracket for securing a side airbag for an automotive vehicle in accordance with a second exemplary embodiment of the present invention.

As shown, the side airbag securing bracket 600 for an automotive vehicle in accordance with a second exemplary embodiment of the present invention includes a mounting plate 620, and a bracket clip 610 coupled to the mounting plate 620.

In addition, securing hooks 622 are formed at both sides of a coupling part 626 of the mounting plate 620, and a restraint member 623, which is partially bendable, is fixed to a main body 621.

In the drawings, the restraint member 623 is fixed to a lower end of the main body 621 inside the vehicle, and is installed to surround a housing 650 of the side airbag.

Although the restraint member 623 in the drawing is formed of two wires, it may be formed of three wires or more.

A hook fastening part 625 is formed at one end of the restraint member 623 to be coupled to the securing hooks 622.

Cutout parts 624 are formed at one part of the restraint member 623 adjacent to a headliner 604 (the interior of the vehicle) such that the restraint members 623 are broken upon deployment of a side airbag cushion 651 to deploy the cushion 651 into the vehicle. In the drawings, the cutout parts 624 are formed at lower corner parts of an airbag housing 652 adjacent to the headliner 604.

The cutout parts 624 are formed to be cut in concave shape at both sides of the restraint member 623 so as to be readily broken upon deployment of the cushion.

The support plates of the bracket clip 620 may be disposed between two projection thresholds 629 formed at the coupling part 626.

For this purpose, a bent part 612 of the bracket clip 610 has a thickness equal to or slightly larger than that of the coupling part 626 to surround the coupling part 626, and the bracket clip 610 has a width equal to or slightly smaller than that of a gap between the two projection thresholds 629.

In this case, the securing hooks 622 may be formed on the projection thresholds 629.

In addition, an annular threshold 615 is formed on an outer circumference of a through-hole 614 on the inner surface of any one of the two support plates 611a and 611b. The annular threshold 615 passes through the hole 614 of the coupling part 626 and is inserted into the other support plate 611a or 611b.

Each of the through-holes in the support plate 611a, the coupling part 626 and the support plate 611b is formed at the same position, to make it easy to fasten the bolt.

Hooking protrusions 613 are respectively formed at both side ends of the support plate 611a or 611b which is secured to the roof side panel 602. The hooking protrusions 613 are hooked in hook grooves (not shown) formed on the roof side panel 602 before the bolt is screwed.

Therefore, since an operator does not need to hold the bracket 600 by hand or any additional tool before the bracket 600 is fastened to the body of the vehicle by the bolt, the installation is simple and the working time is shortened. Further, since the bracket clip 610 is prevented from turning by the rotation force generated when the bolt is screwed, the installation work is easier.

Further, since the bracket is made of the iron material, a fastened part is not seriously damaged in spite of the excessive rotation force and fastening when the bolt is screwed.

Figure 10A:
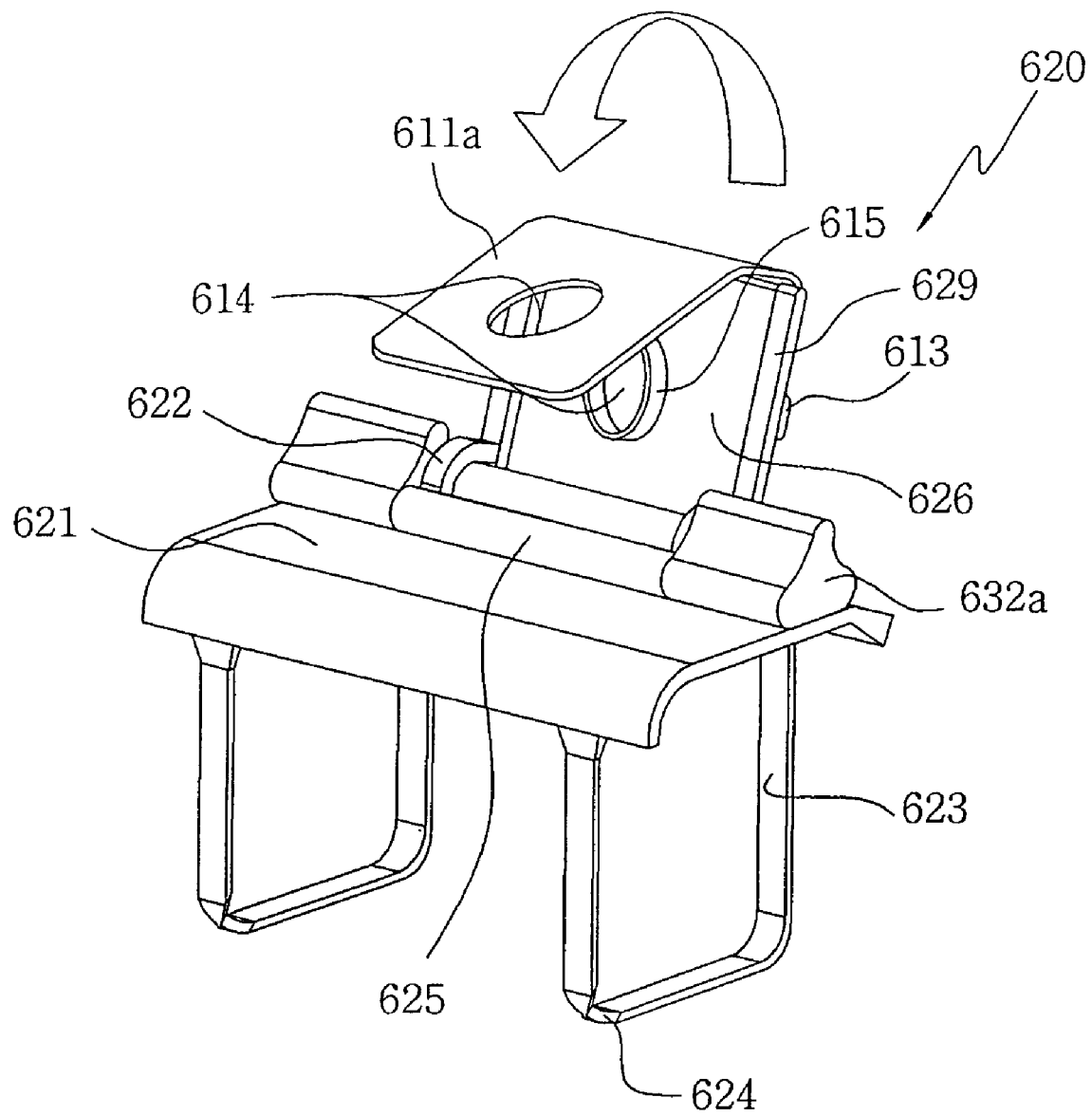
FIG. 10A is a perspective view of a bracket in accordance with a second exemplary embodiment of the present invention.

As illustrated in FIG. 10A, a bracket clip 610 with folded support plates 611a and 611b covers a coupling part 626, thereby allowing an annular threshold 615 formed on any one support plate 611a or 611b to be inserted into an through-hole 614 of the coupling part 626 and subsequently inserted into the other support plate 611a or 611b while hooking protrusions 613 of the bracket clip 610 are hooked in hook grooves (not shown) of a roof side panel 602.

Figure 10B:
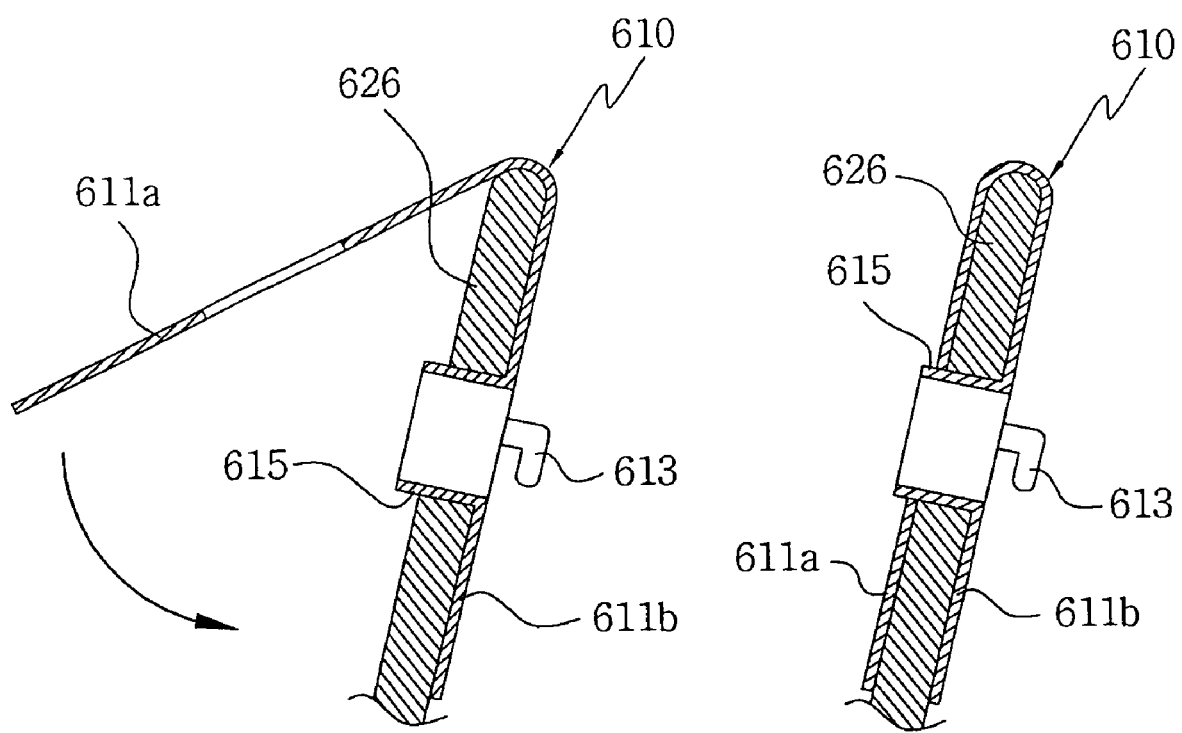
FIG. 10B is a cross-sectional view showing a coupling structure of a coupling part and a bracket clip of FIG. 10A.

FIG. 10B shows a section view of the installed bracket clip 610. As illustrated, the annular threshold 615 formed in the inner side of the support plate 611b of the bracket clip 610 is inserted into the coupling part 626 from the back side of the coupling part 626. Subsequently, the annular threshold 615 protruding from the coupling part 626 is inserted into the through-hole 614, which is formed on the other support plate 611a which is bent over the upper part of the coupling part 626. Therefore, a body 620 is secured by the bracket clip 610.

Figure 11A:
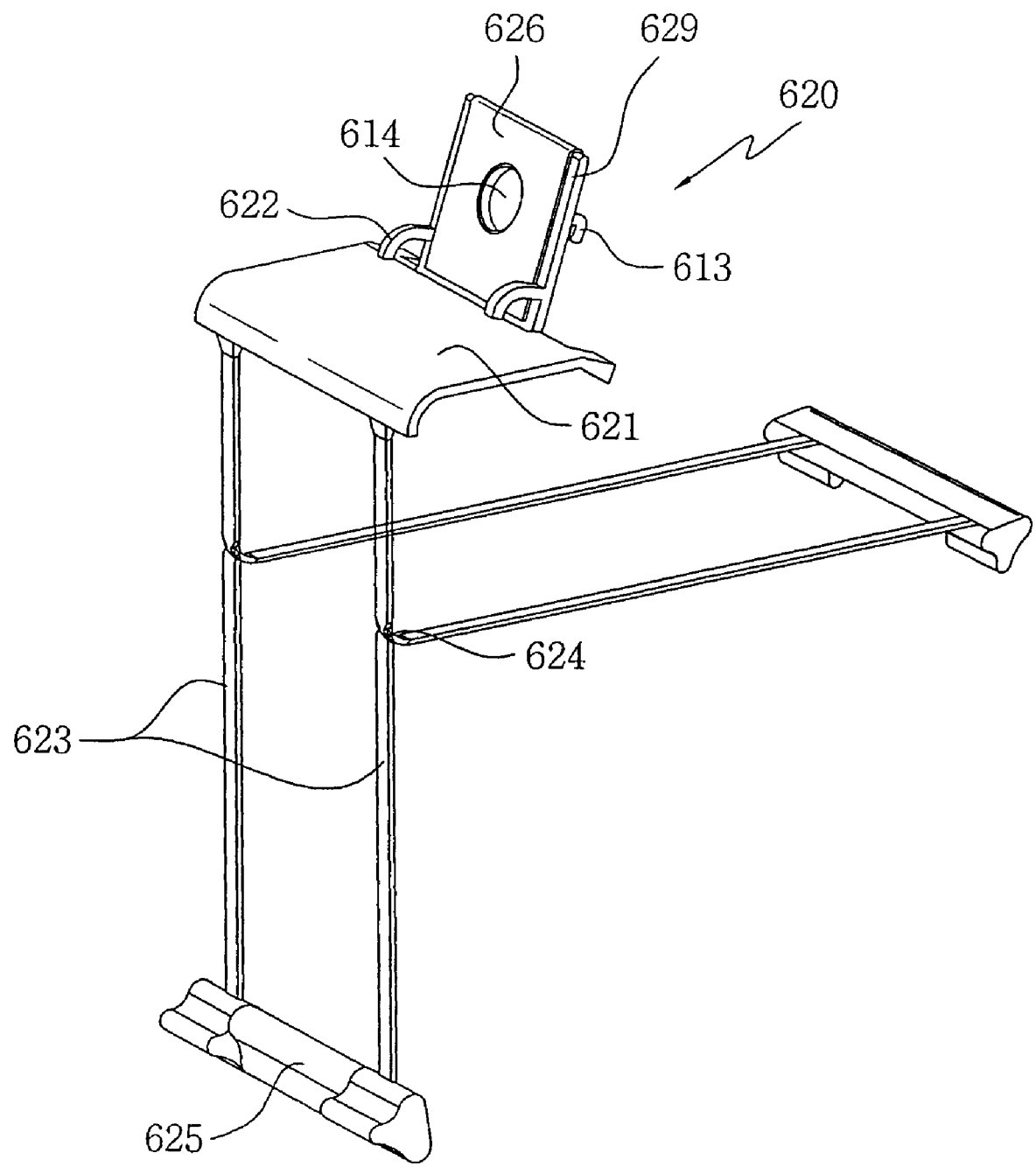
FIGS. 11A and 11B are perspective views of the securing bracket in accordance with a second exemplary embodiment of the present invention.
Figure 11B:
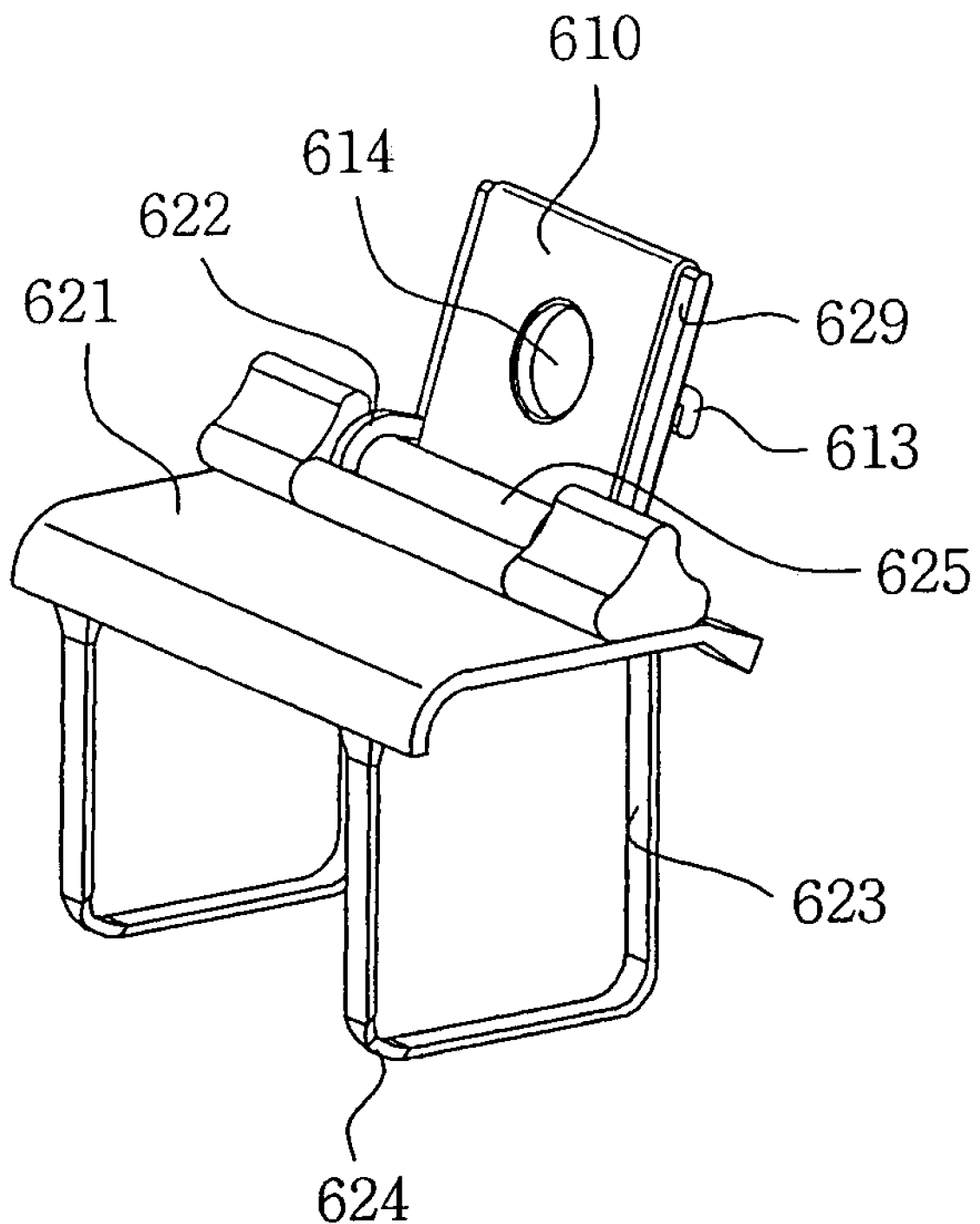

FIGS. 11A and 11B show mounting of the bracket 600 in accordance with the present invention.

As illustrated in FIG. 11A, restraint members 623 are respectively firstly bent at cut parts 624. As illustrated in FIG. 11B, the restraint members are respectively secondarily bent at locations which are same as a main body 621 in width, to cover a side airbag housing 652.

After turning a part of the hook fastening part 625 connected to the restraint members 623 from the back of the bracket clip 610 to the front of the bracket clip 610, the secondarily bent restraint members 623 allow the hook fastening part 625 to be hooked into the securing hooks 622 positioned at both sides of the coupling part 626.

Stopper projections 632a are formed at both ends of the hook fastening part 625 disposed outside the securing hook 622 to restrain lateral shaking of the hook fastening part 625, thereby enabling stable fixation of the side airbag.

As can be seen from the foregoing, a bracket for securing a side airbag for an automotive vehicle in accordance with the present invention is coupled to a mounting plate formed of a synthetic resin material using a bracket clip formed of a metal to prevent damage to or deformation of a coupling part upon fastening of a bolt, thereby enabling operation of the airbag in an optimal state.

In addition, it is possible to restrain the side airbag using a restraint member without additional parts, thereby reducing manufacturing costs and operation time in a manufacturing plant.

Further, when the restraint member having a cutout part is installed, a cushion is deployed to break the cutout part to thereby enable smooth deployment thereof.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A bracket for securing a side airbag for an automotive vehicle, comprising:
    a mounting plate formed of a synthetic resin material, and including a main body and a coupling part projecting from an upper surface of the main body, said coupling part having a front surface, a rear surface, sides intersecting the main body and a hole, said coupling part comprising projection thresholds along the sides bent relative to the front surface; and
    a bracket clip including a front support plate in contact with the front surface intermediate the projection thresholds and a rear support plate in contact with the rear surface, said front and rear support plates having through-holes in communication with the hole, and a bent part connecting the front and rear support plates.

2. The bracket according to claim 1, wherein the front and rear support plates of the bracket clip are formed about the bent part to be freely folded or unfolded.

3. The bracket according to claim 1, wherein the main body has a coupling hole passing therethrough.

4. The bracket according to claim 1, wherein an annular threshold is formed at an inner surface of any one support plate such that the annular threshold is inserted through the hole of the coupling part and the through-hole of the other support plate upon assembly.

5. The bracket according to claim 4, wherein the annular threshold formed at the support plate is formed around the through-hold of the support plate.

6. The bracket according to claim 1, wherein the bracket clip has a hooking threshold projecting toward a vehicle body.

7. A bracket for securing a side airbag for an automotive vehicle, comprising:
    a mounting plate formed of a synthetic resin material, and including a main body and a coupling part projecting from an upper surface of the main body, said coupling part having a front surface, a rear surface, sides intersecting the main body and a hole, said coupling part comprising projection thresholds along the sides bent relative to the front surface; and
    a bracket clip including a front support plate in contact with the front surface intermediate the projection thresholds and a rear support plate in contact with the rear surface, said front and rear support plates having through-holes in communication with the hole, and a bent part connecting the front and rear support plates, wherein the coupling part has a securing hook, and
        a restraint member is fixed to the main body to be at least partially bent, and a hook fastening part is formed at one end of the restraint member to be coupled to the securing hook.

8. The bracket according to claim 7, wherein stopper projections are formed at both ends of the hook fastening part disposed at outer sides of the securing hooks to restrain lateral shaking of the hook fastening part.

9. The bracket according to claim 7, wherein a cut-out part is formed at the bent part disposed inside the vehicle, among the bent parts of the restraint member.

10. The bracket according to claim 7, wherein the restraint member is formed of synthetic resin.

11. The bracket according to claim 7, wherein the front and rear support plates of the bracket clip are formed about the bent part to be freely folded or unfolded.

12. The bracket according to claim 7, wherein an annular threshold is formed at an inner surface of any one support plate such that the annular threshold is inserted through the hold of the coupling part and the through-hole of the other support plate upon assembly.

13. The bracket according to claim 12, wherein the annular threshold formed at the support plate is formed around the through-hole of the support plate.

14. The bracket according to claim 7, wherein the bracket clip has a hooking threshold projecting toward a vehicle body.

15. The bracket according to claim 7 wherein a securing hook is formed at the projection thresholds, respectively.

* * * * *